(12) United States Patent
Kaneko

(10) Patent No.: US 6,209,501 B1
(45) Date of Patent: Apr. 3, 2001

(54) SUCTION SYSTEM FOR INTERNAL COMBUSTION ENGINE

(75) Inventor: Hiroyuki Kaneko, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/377,622

(22) Filed: Aug. 20, 1999

(30) Foreign Application Priority Data

Sep. 4, 1998 (JP) ................................................. 10-267314

(51) Int. Cl.[7] .............................................. F02M 35/104
(52) U.S. Cl. ........................................................ 123/184.21
(58) Field of Search ........................ 123/184.52, 184.45, 123/184.42, 189.53, 184.57, 432, 308, 336, 306, 184.21, 193.5, 568.17, 568.18

(56) References Cited

U.S. PATENT DOCUMENTS 5,765,372 * 6/1998 Mitobe et al. ........................ 60/301

* cited by examiner

Primary Examiner—Noah P. Kamen
Assistant Examiner—Hyder Ali
(74) Attorney, Agent, or Firm—Flynn, Thiel, Boutell & Tanis, P.C.

(57) ABSTRACT

A suction system for an internal combustion engine has branch pipes of an intake manifold disposed on and connected to a cylinder head through a swirl valve assembly. The swirl valve assembly includes first and second intake passages provided in a main body thereof and a swirl valve disposed in one of the first and second intake passages. The first and second intake passages communicate with a single combustion chamber, and a tank chamber is provided in the main body and is defined between first and second intake passage walls and a peripheral wall which surrounds the first and second intake passage walls. The tank chamber is further defined and closed off by being connected to a structure associated with either the branch pipes or the cylinder head, and a negative pressure introduction passage is provided in the main body and introduces negative suction pressure into the tank chamber from the other of the first and second intake passages.

15 Claims, 12 Drawing Sheets

SUCTION SYSTEM FOR INTERNAL COMBUSTION ENGINE

FIELD OF THE INVENTION

This invention relates to a suction system for an internal combustion engine. More particularly, it relates to a suction system for an internal combustion engine which provides fewer components, is lighter in weight, and effectively utilizes space in an engine room or compartment. In addition, the invention provides improved rigidity of a swirl valve assembly, improved mounting rigidity of an intake manifold, and improved reliability of a throttle body.

BACKGROUND OF THE INVENTION

In internal combustion engines disposed in vehicles, there is one type of engine including a device that is operated by negative suction pressure. In addition, there is such a device of the type including a negative pressure tank for storing the negative suction pressure. Such a tank protects against instances where the negative suction pressure sufficient to operate the internal combustion engine may be impossible to ensure, dependent upon different states in which the engine is run.

One example of such a device is a suction system that imparts swirl to intake air, which is aspirated into a combustion chamber, and thereby provides improved combustibility, with consequential respective reductions in a fuel consumption rate and harmful exhaust components. In some of the suction systems, branch pipes of an intake manifold are connected to a cylinder head of the engine through a swirl valve assembly, and further a swirl valve is disposed in the swirl valve assembly.

One example of such a swirl valve assembly of the suction system is shown in FIG. 18. In FIG. 18, reference numeral 202 denotes a suction system for a multi-cylinder internal combustion engine (not shown); 204 a swirl valve assembly; 206 a main body; and, 208, 210 first and second intake passages. In the suction system 202, the swirl valve assembly 204 has the first and second intake passages 208, 210 provided in the main body 206. The first and second intake passages 208, 210 communicate with a single combustion chamber (not shown).

The swirl valve assembly 204 has swirl valves 212 disposed in one of the first and second intake passages 208, 210, i.e., the second intake passage 210 in FIG. 18. The swirl valves 212 are opened and closed by a swirl valve actuator (not shown). The swirl valve actuator is a negative pressure-operated apparatus (not shown).

There is a negative pressure tank 214 separated from the main body 206. The tank 214 includes a tank chamber 216, in which negative suction pressure is stored. The negative suction pressure is introduced into the swirl valve actuator from the tank 214. The main body 206 includes a negative pressure introduction passage 218 for introduction of the negative suction pressure from the other of the first and second intake passages 208, 210, i.e., the first intake passage 208 in FIG. 18.

The negative pressure introduction passage 218 and the tank chamber 216 communicate with one another through a communication pipe 220. A check valve 222 is disposed substantially midway along the communication pipe 220 for permitting the negative suction pressure to be introduced from the negative pressure introduction passage 218 into the tank chamber 216.

In the suction system 202, an actuator control valve (not shown) serves to control the negative suction pressure that is supplied to the swirl valve actuator form the negative pressure tank 214. Then, the swirl valves are opened and closed to impart swirl to intake air that enters the combustion chamber, thereby providing improved combustibility.

Several examples of such a suction system are disclosed in published Japanese Patent Application Laid-Open Nos. 64-11358, 8-30457, and 3-41056, as discussed below.

In the suction system as disclosed in Application No. 64-11358, there is provided a tank body having a space isolated by both an inner space of a collector on the upstream side of an intake manifold and a partition wall. A one-way valve is provided on the partition wall.

In the suction system as disclosed in Application No. 8-30457, a negative pressure tank is disposed on branch members that are serially arranged on the downstream side of an intake pipe. The negative pressure tank is common to cylinders. The negative pressure tank is connected to an intake passage through a communication passage. A control valve is provided in the communication passage.

In the suction system as disclosed in application No. 3-41056, a closed space between a surge tank, which surge tank forms an intake expansion chamber, and a member that forms an independent intake passage extending in a curved manner downwardly from the top of the surge tank. The intake expansion chamber and the closed space communicate with one another through a negative pressure passage. A check valve is disposed in the negative pressure passage.

In the suction system 202 of a conventional type as illustrated in FIG. 18, the swirl valves 212 are disposed in the swirl valve assembly 204. In addition, the separate negative pressure tank 214 reserves the negative suction pressure that is supplied to the swirl valve actuator for opening and closing the swirl valves 212. However, such a separate tank 214 brings about inconveniences of an increased number of components, heavier weight, and restrictions on layout.

As a consequence, there is a suction system of the type having the negative pressure tank integrally assembled on either the branch pipes of the intake manifold or the surge tank, as described in the above-cited references.

However, as is the case with the suction system 202 shown in FIG. 18, an inconvenience of complex layout arises when the branch pipes of the intake manifold are connected to a cylinder head through the swirl valve assembly 204. This is because pipes must be laid from the negative pressure tank disposed on either the branch pipes or the surge tank to the swirl valve actuator that opens and closes the swirl valves 212 in the swirl valve assembly 204.

SUMMARY OF THE INVENTION

In order to obviate or minimize the above inconveniences, one aspect of the present invention relates to a suction system for a multi-cylinder internal combustion engine having branch pipes of an intake manifold disposed on and connected to a cylinder head through a swirl valve assembly. The suction system includes first and second intake passages provided in a main body of the swirl valve assembly and a swirl valve disposed in one of first and second intake passages, the first and second intake passages communicating with a single combustion chamber, a tank chamber provided in the main body and formed between first and second intake passage walls and a peripheral wall surrounding the first and second intake passage walls. The first and second intake passage walls form or define the first and second intake passages, and the tank chamber is defined and blocked by being connected to one of the branch pipes and the cylinder head. A negative pressure introduction passage is provided in the main body for introducing negative suction pressure from the other of the first and second intake passages into the tank chamber.

Another aspect of the present invention relates to a suction system for a multi-cylinder internal combustion engine wherein the swirl valve assembly has the tank chamber formed into at least two parts (i.e., first and second tank chambers), the first tank chamber communicates with the negative pressure introduction passage, the second tank chamber is isolated from the first tank chamber, and wherein the swirl valve assembly includes a communication pipe for enabling communication of the first and second tank chambers with one another. Further, a check valve is disposed in the communication pipe for permitting the negative suction pressure to be introduced into the second tank chamber from the first tank chamber.

A further aspect of the present invention relates to a suction system for a multi-cylinder internal combustion engine wherein the swirl valve assembly has the communication pipe and a negative pressure take-off pipe provided on the main body, the negative pressure takeoff pipe supplying the negative suction pressure from the second tank chamber to a negative pressure-operated apparatus, the communication pipe and the negative pressure take-off pipe being disposed so as to assume downward positions when the swirl valve assembly is connected to the cylinder head.

In the suction system according to the present invention, the tank chamber is provided in the main body of the swirl valve assembly and is formed between the first and second intake passage walls and the peripheral wall. The tank chamber is defined and blocked by being connected to either the branch pipes of the intake manifold or the cylinder head. The negative pressure introduction passage is disposed in the main body of the swirl valve assembly for introducing the negative suction pressure from the other of the first and second intake passages into the tank chamber. In the swirl valve assembly, the tank chamber is divided into at least first and second tank chambers. The check valve is provided in the communication pipe that enables communication between the first and second tank chambers. As a result, the negative pressure tank integrally provided in the swirl valve assembly makes it possible to eliminate the need for a separate negative pressure tank, a mounting bracket, and a space in which a separate negative pressure tank and a pipe are typically arranged. Further, the communication pipe and the negative pressure tank-off pipe are disposed on the main body of the swirl valve assembly. The negative pressure tank-off pipe supplies the negative suction pressure to negative pressure-operated apparatuses. In addition, the communication pipe and the negative pressure tank-off pipe are arranged so as to assume downward positions when the swirl valve assembly is connected to the cylinder head. As a result, the communication pipe and the negative pressure take-off pipe can be disposed without interfering with other components.

Moreover, the strength of the swirl valve assembly can be increased by the peripheral wall extending around the first and second intake passage walls that form the first and second intake passages. Thus, the intake manifold can be rigidly mounted on the swirl valve assembly. As a result, vibrations caused by a throttle body mounted the intake manifold are controllable.

RIEF DESCRIPTION OF THE DRAWINGS

DETAILED DESCRIPTION

Figure 1:
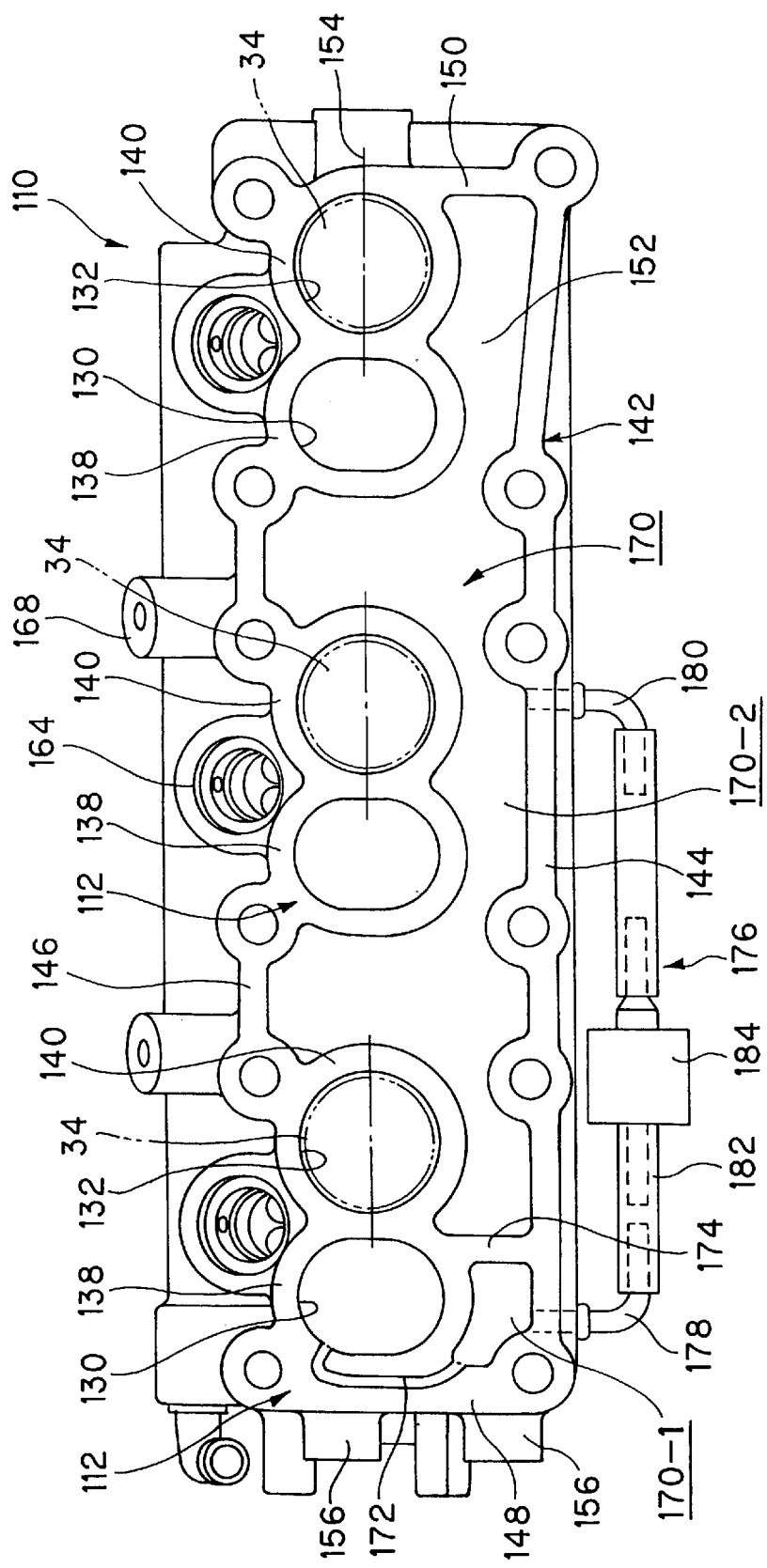
FIG. 1 is a plan view illustrating a main body of a swirl valve assembly in a suction system for an internal combustion engine according to a first embodiment of the present invention.

Embodiments of the present invention will now be described with reference to the drawings. FIGS. 1–12 illustrate a first embodiment. In FIG. 12, reference numeral 2 denotes a multi-cylinder internal combustion engine disposed in a vehicle. The engine 2 has a plurality of combustion chambers 10, for example, three combustion chambers 10 in this embodiment, formed by a cylinder block 4, a cylinder head 6, and pistons 8. A head cover 12 has ignition coils 14 mounted therein for feeding sparks to ignition or spark plugs (not shown).

The engine 2 has an intake manifold 28 and a swirl valve assembly 30 sequentially connected together (i.e., the intake manifold 28 is upstream of the swirl valve assembly 30) as a suction system 16. The intake manifold 28 includes an air cleaner 18, an intake pipe 20, a throttle body 22, a surge tank 24, and branch pipes 26. The swirl valve assembly 30 is connected to the cylinder head 6. A throttle valve 32 is disposed in the throttle body 22. Swirl valves 34 are provided in the swirl valve assembly 30. In addition, the engine 2 has an exhaust manifold 38, an exhaust pipe 40, and a catalyst or catalytic converter 42 serially connected together to form an exhaust system 36.

The engine 2 is provided with fuel injection valves 44 as a fuel system. The fuel injection valves 44 are mounted on the swirl valve assembly 30. A fuel pump 48 supplies fuel from a fuel tank 46 to the fuel injection valves 44 through a fuel pipe 50 which defines a passage therein. Assist air is supplied to the fuel injection valves 44 from the intake pipe 20 through an assist air passage 52. An assist air control valve 54 is disposed in the assist air passage 52.

The fuel tank 46 communicates with a canister 58 through an evaporation passage 56. The canister 58 communicates with a throttle body 22 through a purge passage 60. A purge control valve 62 is provided in the purge passage 60.

The engine 2 is provided with an exhaust gas recirculation (herein "EGR") passage 64 for enabling communication between the exhaust manifold 38 and the surge tank 24. An EGR control valve 66, which is a negative pressure-operated apparatus, is disposed in the EGR passage 64. The EGR control valve 66 communicates with an EGR working pressure passage 68, through which working pressure, i.e., negative suction pressure is supplied. An EGR working pressure control valve 70 is provided in the EGR working pressure passage 68. The EGR working pressure control valve 70 controls the negative suction pressure, which is supplied through the EGR working pressure passage 68, and then opens and closes the EGR control valve 66 so as to regulate an amount of EGR.

The swirl valves 34 disposed in the swirl valve assembly 30 are opened and closed by a swirl valve actuator 72, i.e., a negative pressure-operated. apparatus. The swirl valve actuator 72 communicates with an actuator working pressure passage 74, through which working pressure, i.e., suction negative pressure is supplied. An actuator working pressure control valve 76 is provided in the actuator working pressure passage 74. The actuator working pressure control valve 76 controls the negative suction pressure supplied through the actuator working pressure passage 74, and then actuates the swirl valve actuator 72, thereby causing opening and closing of the swirl valves.

The following components are connected to a control means or device 78: the ignition coil 14; the fuel injection valves 44; the fuel pump 48; the assist air control valve 54; the purge control valve 62; the EGR working pressure control valve 70; and, the actuator working pressure control valve 76. The control means 78 is further connected to a throttle opening sensor 80, an intake pressure sensor 82, an accelerator opening sensor 84, a crank angle sensor 86, a water temperature sensor 88, an engine knock sensor 90, and an oxygen sensor 92. A battery 96 is connected to the control means 78 through an ignition switch 94.

When respective signals from the various sensors 80, 82, 84, 86, 88, 90 and 92 are received by the control means 78, then the control means 78 actuates and controls the ignition coils 14, the fuel injection valves 44, the fuel pump.48, the assist air control valve 54, the purge control valve 62, the EGR working pressure control valve 70, and the actuator working pressure control valve 76.

Figure 2:
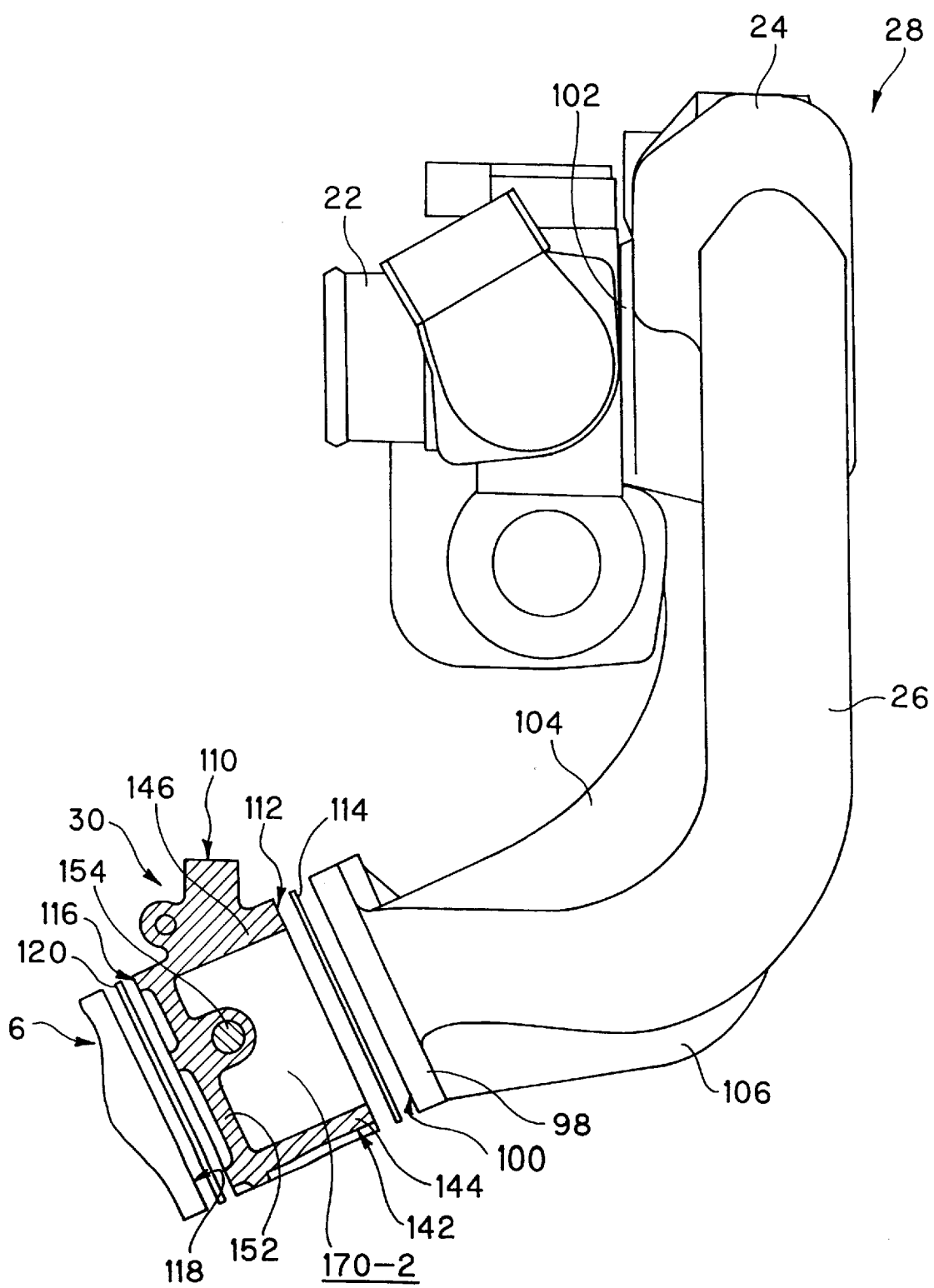
FIG. 2 is a partially cutaway and partially exploded side view shine the suction system.
Figure 3:
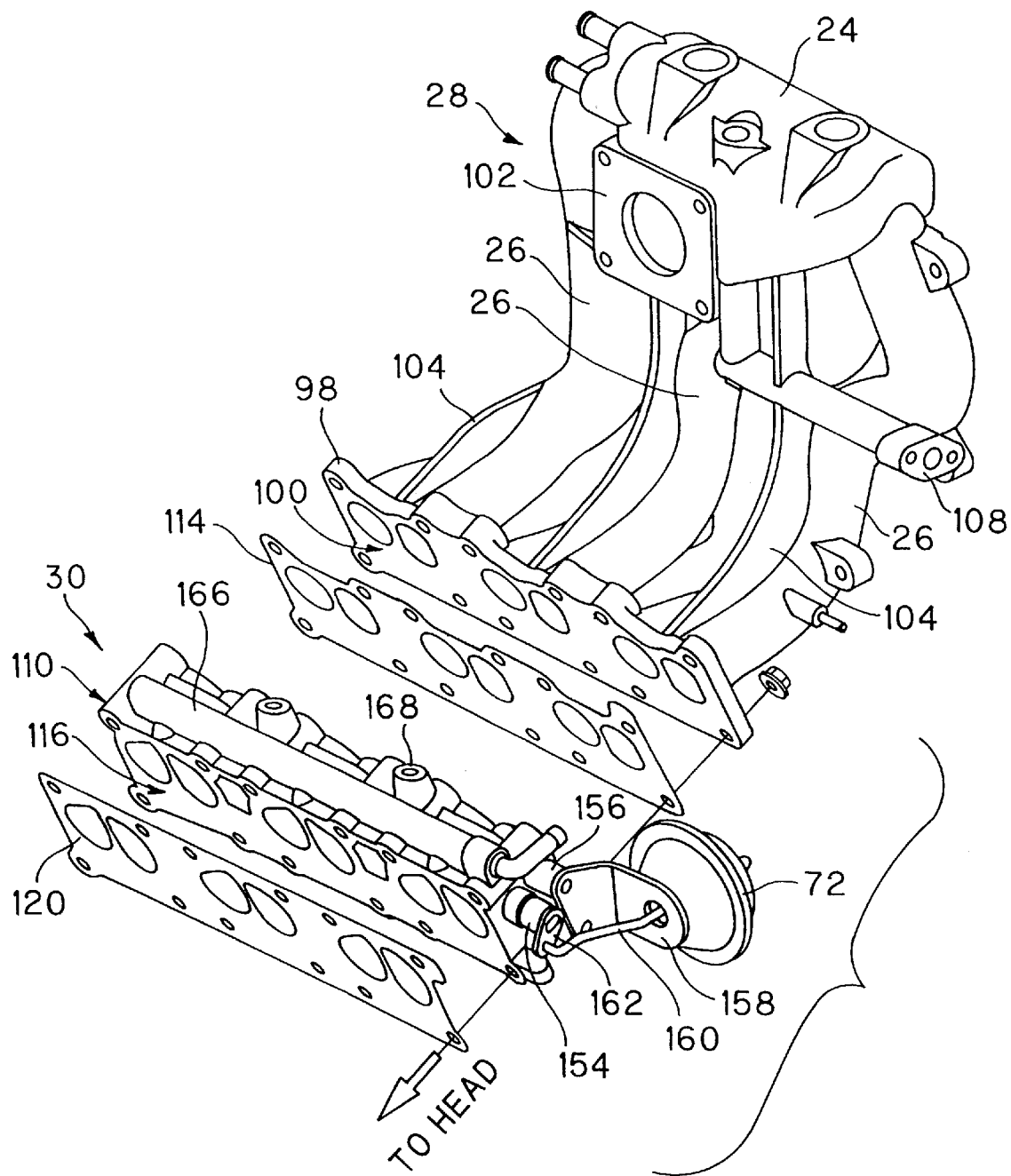
FIG. 3 is an exploded perspective view showing assembly of the suction system.
Figure 4:
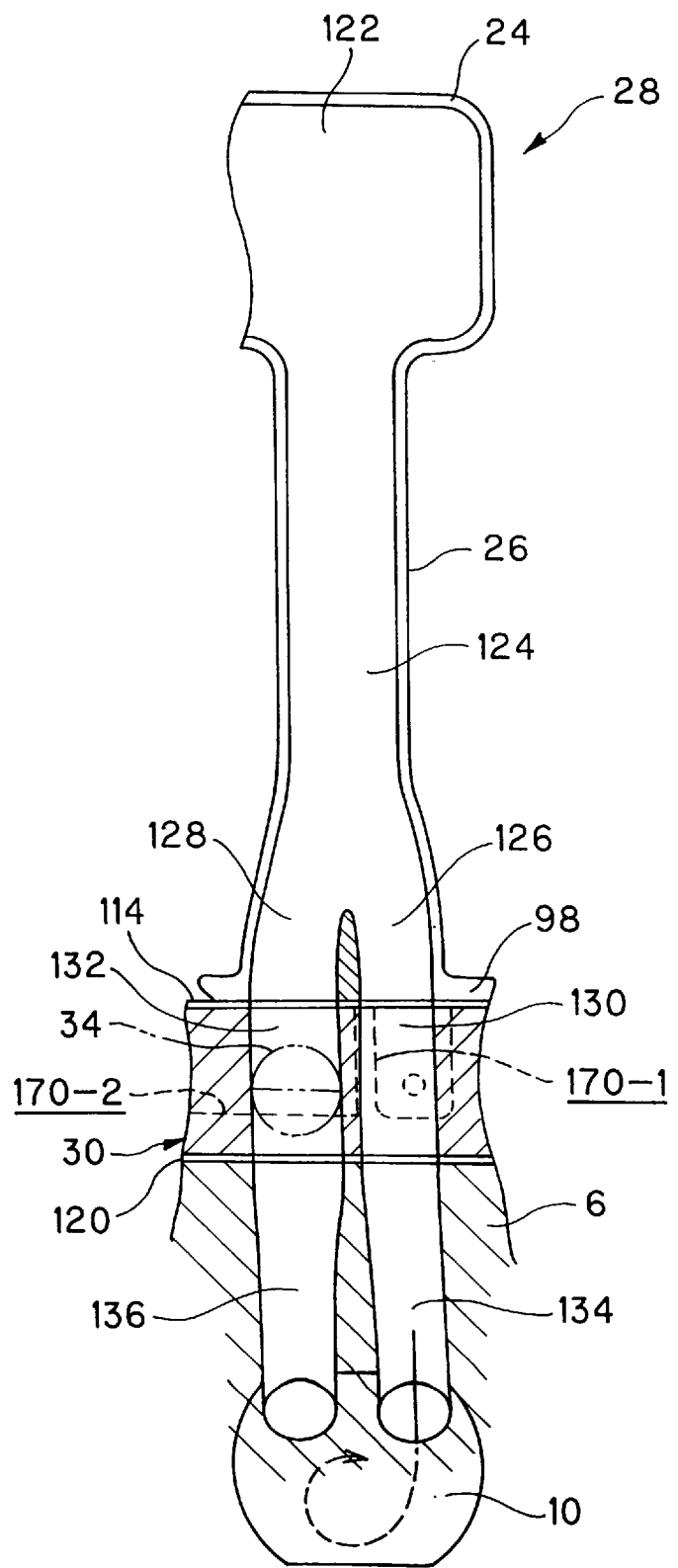
FIG. 4 is a fragmentary cross-sectional view showing the suction system.
Figure 5:
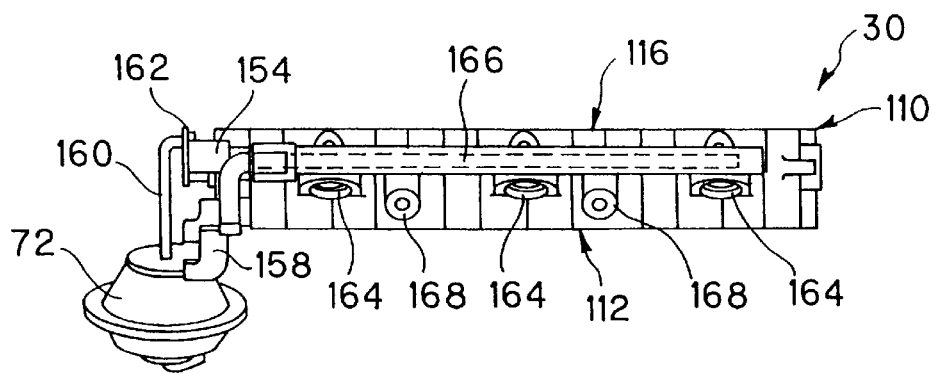
FIG. 5 is a front view illustrating the swirl valve assembly.

Referring to FIGS. 2–4, in the engine 2, the suction system 16 is shown wherein the downstream ends of the branch pipes 26 of the intake manifold 28 are disposed on and connected to the cylinder head 6 through the swirl valve assembly 30.

Figure 9:
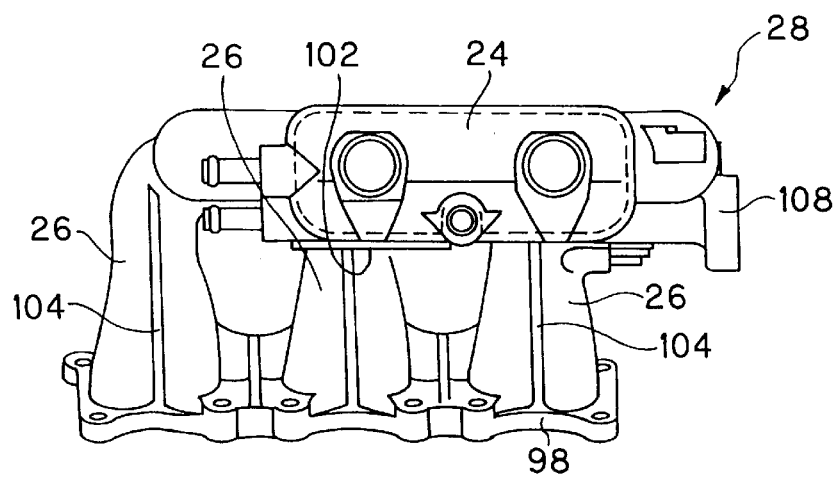
FIG. 9 is a plan view illustrating an intake manifold.
Figure 10:
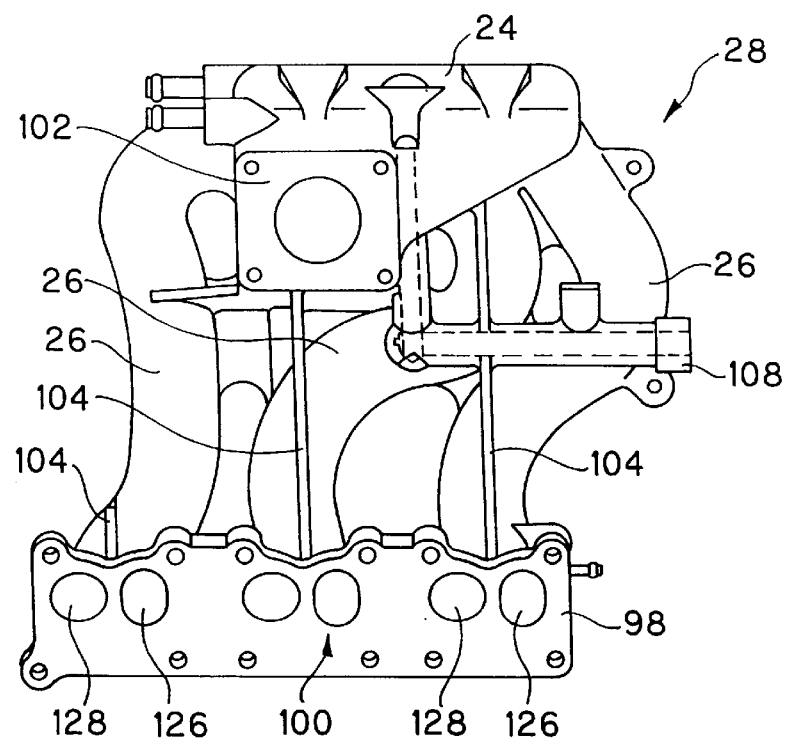
FIG. 10 is a front perspective view illustrating the intake manifold.
Figure 11:
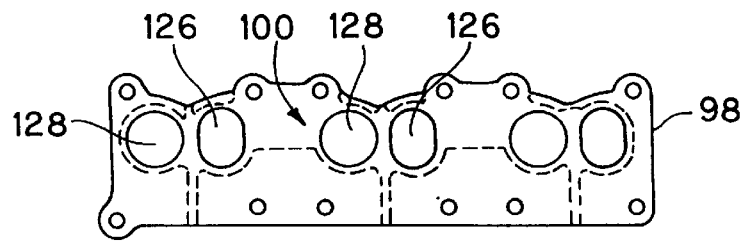
FIG. 11 is a front view showing the intake manifold.
Figure 12:
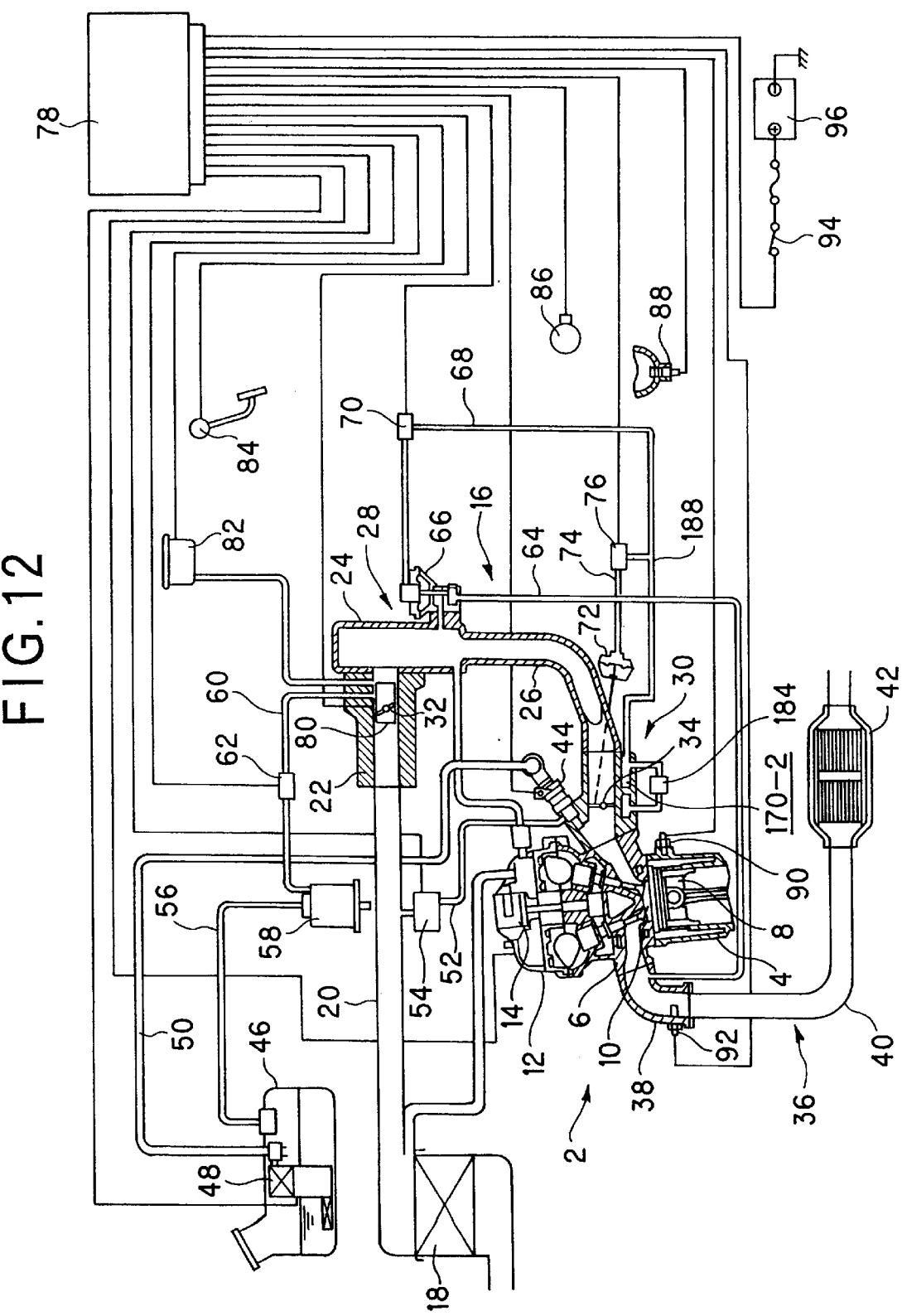
FIG. 12 is a schematic structural illustration showing an internal combustion engine.

As illustrated in FIGS. 9–11, in the intake manifold 28, the upstream ends of the branch pipes 26 (or three branch pipes 26 in this embodiment) are provided on and connected to the surge tank 24. The other or downstream ends of the branch pipes 26 are disposed on and connected to a mounting flange 98 in series in a longitudinal direction of the mounting flange 98. A mounting flange surface 100 is provided on the mounting flange 98. The intake manifold 28 has a throttle body-mounting seat 102 disposed on the surge tank 24. The intake manifold 28 also includes plate-like reinforcing ribs 104, 106 (FIG. 2) provided on the sides of the branch pipes 26 in a radial direction thereof. Reference numeral 108 is an EGR control valve-mounting seat.

The mounting flange 98 of the intake manifold 28 is connected to the swirl valve assembly 30 by the mounting flange surface 100 being brought into abutting contact with a manifold contact surface 112 of a main body 110 of the swirl valve assembly 30 through a manifold gasket 114.

The swirl valve assembly 30 is connected to the cylinder head 6 by a head contact surface 116 of the main body 110 being positioned against an assembly contact surface 118 of the cylinder head 6 through a head gasket 120.

With reference to FIG. 4, on the intake manifold 28, branch passages 124 of three branch pipes 26 communicate at the upstream ends thereof to a tank chamber 122 of the surge tank 24. The other or downstream ends of the branch passages 124 are divided into first and second branch passages 126, 128.

Referring to FIGS. 5–8, the swirl valve assembly 30 is shown having three pairs of first and second intake passages 130, 132 arranged in series in the longitudinal direction of the main body 110. The first and second intake passages 130, 132 extend between the manifold contact surface 112 and the head contact surface 116. Each pair of the first and second intake passages 130, 132 communicate at upstream ends thereof with the first and second branch passages 126, 128 of the corresponding branch passage 124, respectively. The swirl valves 34 are positioned in one of the first and second intake passages 130, 132, i.e., the second intake passages 132 in this embodiment.

The cylinder head 6 has three pairs of first and second intake ports 134, 136 provided therein. Each pair of the first and second intake ports 134, 136 at upstream ends thereof are connected to the downstream ends of the corresponding pair of the first and second intake passages 130, 132, respectively. The downstream ends of each pair of the first and second intake ports 134, 136 are connected to one of three combustion chambers 10 that are provided in the engine 2.

As illustrated in FIGS. 1 and 2, the swirl valve assembly 30 has three pairs of first and second intake passage walls 138, 140 and a peripheral wall 142 provided in the main body 110. The first and second intake passage walls 138, 140 form the first and second intake passages 130, 132, respectively. The peripheral wall 142 surrounds the first and second intake passage walls 138, 140. The manifold contact surface 112 and the head contact surface 116 are positioned on both sides of these walls 138, 140, and 142 in the direction of the first and second intake passages 130, 132.

The peripheral wall 142 includes transversely opposite peripheral walls 144, 146 and longitudinally opposite peripheral walls 148, 150. The transversely opposite peripheral walls 144, 146 are opposed to one another in a transverse direction of the main body 110. The longitudinally opposite peripheral walls 148, 150 are opposed to one another in a longitudinal direction of the main body 110. A bottom portion 152 (FIG. 2) is provided inside the peripheral wall 142. The bottom portion 152 is connected to the transversely and longitudinally opposite peripheral walls 144, 146 and 148, 150 near the head contact surface 116.

The swirl valve assembly 30 has a swirl valve shaft 154 rotably supported in the main body 110. The swirl valve shaft 154 extends through the first and second intake passage walls 138, 140 and the longitudinally opposite peripheral walls 148, 150. The swirl valves 34 are provided on the swirl valve shaft 154 at locations where the swirl valve shaft 154 is inserted through the inside of the second intake passages 132 (i.e., the swirl valves 34 are located within the respective second intake passages 132).

As illustrated in FIGS. 1 and 3, an actuator-mounting boss 156 is provided on the peripheral wall 148 at one end of the main body 110 and extends in the longitudinal direction thereof. The swirl valve actuator 72 is mounted on the actuator-mounting boss 156 through a mounting bracket 158.

The swirl valve actuator 72 includes a diaphragm (not shown) and a rod 160. The negative suction pressure that acts on a pressure chamber (not shown) actuates the diaphragm. That diaphragm moves the rod 160 between an advanced position and a retracted position. The rod 160 is connected to a crank 162 of the swirl valve shaft 154, which shaft 154 extends through the peripheral wall 148 at one end of the main body 110 in the longitudinal direction thereof, and further which shaft 154 protrudes outwardly from the main body 110 adjacent peripheral wall 150.

The swirl valve assembly 30 is further provided with a fuel injection valve-mounting boss 164, an assist air passage pipe 166 and a delivery pipe-mounting boss 168 (FIG. 3).

In the suction system 16, the swirl valve assembly 30 has a tank chamber 170 provided in the main body 110. The tank chamber 170 is formed between the first and second intake passage walls 138, 140 and the peripheral wall 142. The tank chamber 170 is defined and blocked by being connected to either the branch pipes 26 or the cylinder head 6.

In this embodiment, as illustrated in FIGS. 1 and 2, the tank chamber 170 is formed in the main body 110 and is defined by the first and second intake passage walls 138, 140, the peripheral wall 142, and the bottom portion 152. The tank chamber 170 opens through the manifold contact surface 112, and when main body 110 is connected to the mounting flange 98 with the manifold gasket 114 being disposed therebetween, the chamber 170 is closed off or blocked to form an enclosed chamber.

A negative pressure introduction passage 172 is provided in the main body 110 for introducing the negative suction pressure into the tank chamber 170 from the other of the first and second intake passages 130, 132, or, in this embodiment, the first intake passage 130 at one end of the main body 110. In order to prevent oil mists from entering the negative pressure introduction passage 172, the manifold contact surface 112 is dented, whereby the introduction passage 172 is formed in the peripheral wall 148 at one end of the main body 110 (i.e., the passage 172 is formed as a groove in surface 112). When the main body 110 is connected to the mounting flange 98 through the manifold gasket 114, the introduction passage 172 is thereby blocked and forms a negative pressure introduction passage.

In this embodiment, a partition wall 174 extends between the first intake passage wall 138 at one end of the main body 110 in the longitudinal direction thereof and the transverse opposite peripheral wall 144 at one end of the main body 110 in the transverse direction thereof. As a result, the tank chamber 170 is formed into at least two parts including first and second tank chambers 170-1, 170-2. The first tank chamber 170-1 communicates with the negative pressure introduction passage 172. The second tank chamber 170-2 is separated from the first tank chamber 170-1 by the partition wall 174.

A communication pipe 176 is provided on the transverse opposite peripheral wall 144 at one end of the main body 110 for enabling communication between the first and second tank chambers 170-1, 170-2. The communication pipe 176 includes first and second communication pipes 178, 180 and a hose 182. The first communication pipe 178 communicates with the first tank chamber 170-1. The second communication pipe 180 communicates with the second tank chamber 170-2. The hose 182 connects the first and second communication pipes 178, 180 together. In addition, the communication pipe 176 has a check valve 184 disposed substantially midway along the hose 182. The check valve 184 permits negative suction pressure to be introduced into the second tank chamber 170-2 from the first tank chamber 170-1.

Figure 6:
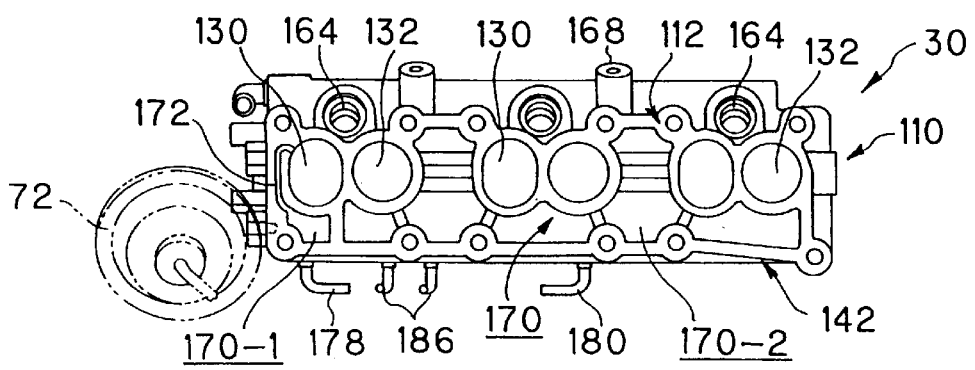
FIG. 6 is a plan view illustrating the swirl valve assembly.
Figure 7:
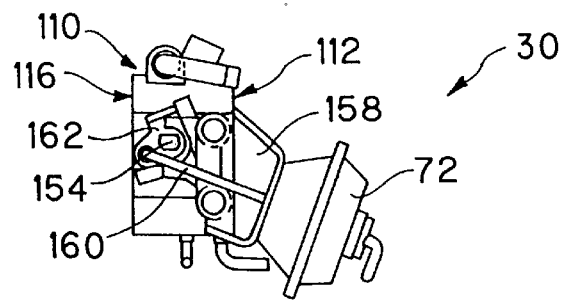
FIG. 7 is a side view showing the swirl valve assembly.
Figure 8:
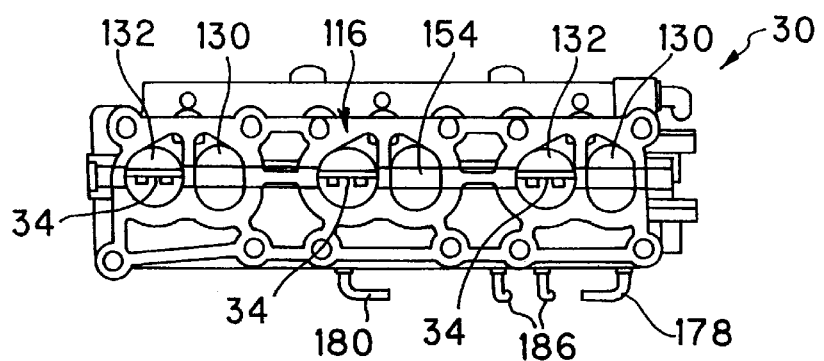
FIG. 8 is a bottom view showing the swirl valve assembly.

As illustrated in FIGS. 6–8, in addition to the communication pipe 176, the swirl valve assembly 30 has a negative pressure take-off pipe 186 provided on the main body 110. This pipe 186 supplies the negative suction pressure from the second tank chamber 170-2 to the negative pressure-operated apparatuses, i.e., the EGR control valve 66 and the swirl valve actuator 72.

As illustrated in FIG. 12, the negative pressure take-off pipe 186 communicates with the EGR working pressure passage 68 and the actuator working pressure passage 74 through a negative pressure take-off passage 188. As a result, the EGR working pressure passage 68 permits the negative suction pressure to be supplied from the second tank chamber 170-2 to the EGR control valve 66 through the EGR working pressure control valve 70. In addition, the actuator working pressure passage 74 permits the negative suction pressure to be supplied from the second tank chamber 170-2 to the swirl valve actuator 72 through the actuator working pressure control valve 76. In the swirl valve assembly 30, the communication pipe 176 and the negative pressure take-off pipe 186 are disposed so as to assume downward positions when the swirl valve assembly 30 is connected to the cylinder head 6.

Next, the operation of this embodiment will be described.

In the internal combustion engine 2, the suction system 16 has the branch pipes 26 of the intake manifold 28 positioned on and connected to the cylinder head 6 through the swirl valve assembly 30. The swirl valve assembly 30 has the tank chamber 170 provided in the main body 110 and formed between the first and second intake passage walls 138, 140 and the peripheral wall 142. The tank chamber 170 is defined and blocked by being connected to the mounting flange 98.

The tank chamber 170 of the swirl valve assembly 30 is formed into two parts including first and second tank chambers 170-1 and 170-2. The swirl valve assembly 30 further has the negative pressure introduction passage 172 provided therein for introducing the negative suction pressure from the first intake passage 130 into the first tank chamber 170-1. In addition, the check valve 184 is disposed in the communication pipe 176 that enables communication between the first and second tank chambers 170-1, 170-2.

Accordingly, the suction system 16 allows the negative suction pressure to be introduced from the first intake passage 130 into the first tank chamber 170-1 through the negative pressure introduction passage 172 during operation of the engine 2. The suction system 16 further permits the negative suction pressure from the first tank chamber 170-1 to be stored in the second tank chamber 170-2 via the communication pipe 176 and the check valve 184.

The negative suction pressure is fed from the second tank chamber 170-2 through the negative pressure take-off pipe 186. The negative pressure tank-off passage 188 then permits the negative suction pressure to be supplied to the EGR control valve 66 and the swirl valve actuator 72 through the EGR working pressure passage 68 and the actuator working pressure passage 74, respectively.

As describe above, in the suction system 16, the swirl valve assembly 30 has the tank chamber 170 provided in the main body 110 and formed between the first and second intake passage walls 138, 140 and the peripheral wall 142.

The tank chamber 170 is defined and blocked by being connected to the mounting flange 98. The tank chamber 170 is divided into first and second tank chambers 170-1, 170-2. Further, the negative pressure introduction passage 172 is provided in the swirl valve assembly 30 for introducing the negative suction pressure from the first intake passage 130 into the first tank chamber 170-1. In addition, the check valve 184 is provided in the communication pipe 176 that maintains the first and second tank chambers 170-1, 170-2 in communication with one another.

Thus, the negative pressure tank chamber 170 integrally provided in the swirl valve assembly 30 makes it possible to eliminate a separate negative pressure tank, a mounting bracket, etc. from the suction system 16, and further to eliminate the need for a space in which a separate negative pressure tank and a pipe are positioned.

In addition, the swirl valve assembly 30 has the communication pipe 176 and the negative pressure take-off pipe 186 disposed on the main body 110. Further, the communication pipe 176 and the negative pressure tank-off pipe 186 are arranged so as to assume downward positions when the swirl valve assembly 30 is connected to the cylinder head 6. As a result, the communication pipe 176 and the negative pressure take-off pipe 186 can be provided without interfering with other components.

Consequently, the suction system 16 provides fewer components, is lighter in weight, and effectively utilizes space in an engine room.

In addition, the strength of the swirl valve assembly 30 can be increased by means of the peripheral wall 142 which extends around the first and second intake passage walls 180, 140 respectively, forming the first and second intake passages 130, 132. Thus, the intake manifold 28 can be rigidly mounted on the swirl valve assembly 30. As a result, the vibrations generated by the throttle body 22 mounted on the intake manifold 6 are controllable.

Accordingly, the suction system 16 provides improved rigidity of the swirl valve assembly 30, improved mounting rigidity of the intake manifold 6, and improved reliability of the throttle body 22.

Figure 13:
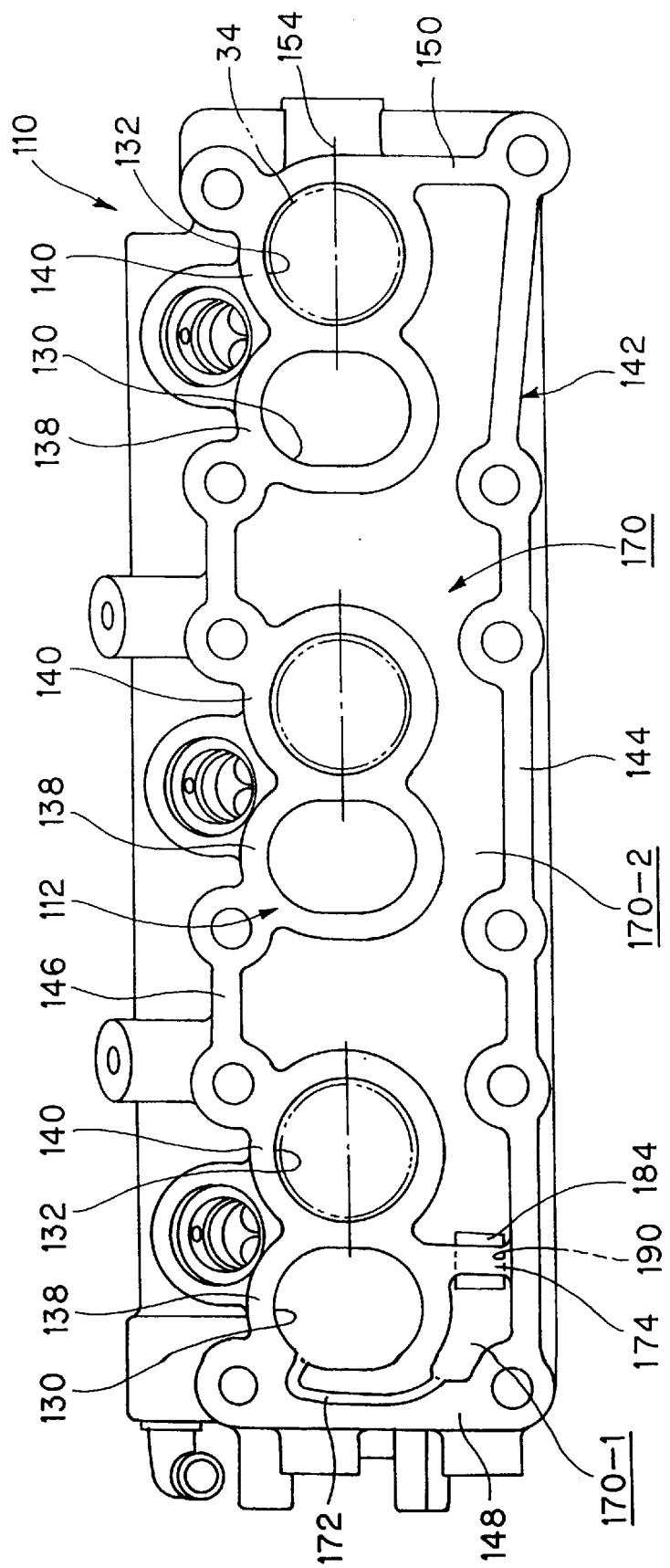
FIG. 13 is plan view illustrating a swirl valve assembly according to a second embodiment.

FIG. 13 illustrates a suction system 16 according to a second embodiment. In the suction system 16 according to this embodiment, a mounting hole 190 is provided in a partition wall 174 that separates a first tank chamber 170-1 from a second tank chamber 170-2. In addition, a check valve 184 is disposed in the mounting hole 190 for permitting the negative suction pressure to be introduced into the second tank chamber 170-2 from the first tank chamber 170-1.

Since the check valve 184 is positioned in the partition wall 174 that separates the first tank chamber 170-1 from the second tank chamber 170-2, with the suction system 16 according to the second embodiment it is possible to eliminate the communication pipe 176 which otherwise would be located outside the main body 110. Further, the suction system 16 according to the present embodiment has fewer components, is lighter weight, and is compact in size, and as a consequence makes more efficient utilization of space in an engine room.

Figure 14:
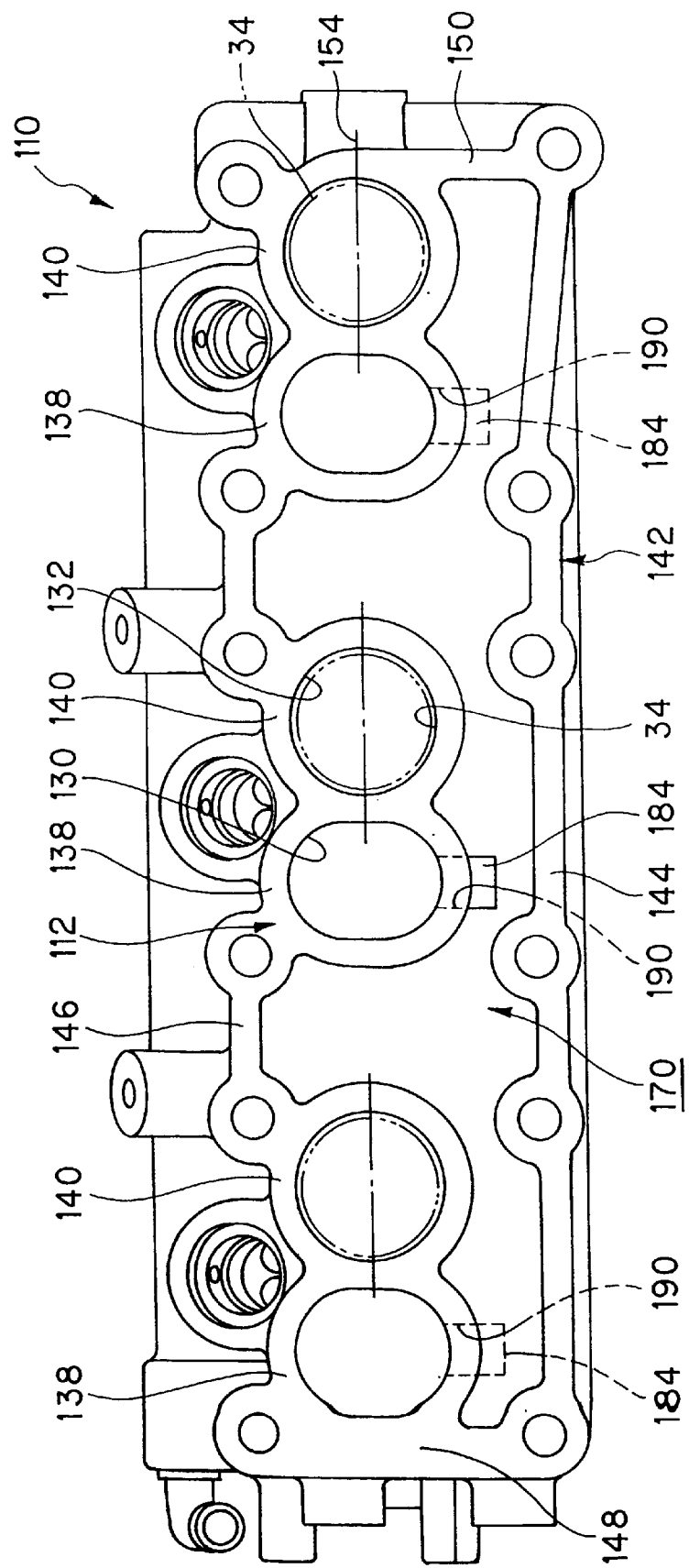
FIG. 14 is a plan view illustrating a swirl valve assembly according to a third embodiment.

FIG. 14 illustrates a suction system 16 according to a third embodiment. In the suction system 16 according to the third embodiment, there is neither a partition wall 174 nor a negative pressure introduction passage 172. The absence of partition wall 174 results in the formation of a single tank chamber 170. Instead of the negative pressure introduction passage 172, a check valve 184 is disposed in a mounting hole 190 for permitting the negative suction pressure to be introduced from the first intake passage 130 into the tank chamber 170. The mounting hole 190 is provided in the first intake passage wall 138 that is located at an intermediate portion of a main body 110 in the longitudinal direction thereof.

In the suction system 16 according to this embodiment, the single tank chamber 170 is formed, thereby providing an enlarged storage volume of negative suction pressure. In addition, there is no need for the communication pipe 176 to be disposed outside the main body 110 because the check valve 184 is provided in the first intake passage wall 138 at the intermediate portion of the main body 110 in the longitudinal direction thereof. As a result, the suction system 16 according to the present embodiment provides fewer components, is lighter weight, and is compact in size, thereby effectively utilizing a space in an engine room.

In the suction system 16 according to the third embodiment, the check valve 184 is provided in the first intake passage wall 138 at the intermediate portion of the main body 110 in the longitudinal direction thereof. Alternatively, as shown by two-double dashed lines in FIG. 14, additional check valves 184 can be provided in the respective first intake passage walls 138 adjacent the opposite longitudinal ends of the main body 110. In this way, the check valves 184 are disposed in all of the first intake passage walls 138. As a result, the negative pressure can be introduced from the respective first intake passages 130 into the tank chamber 170, and thus can be reserved efficiently.

Figure 15:
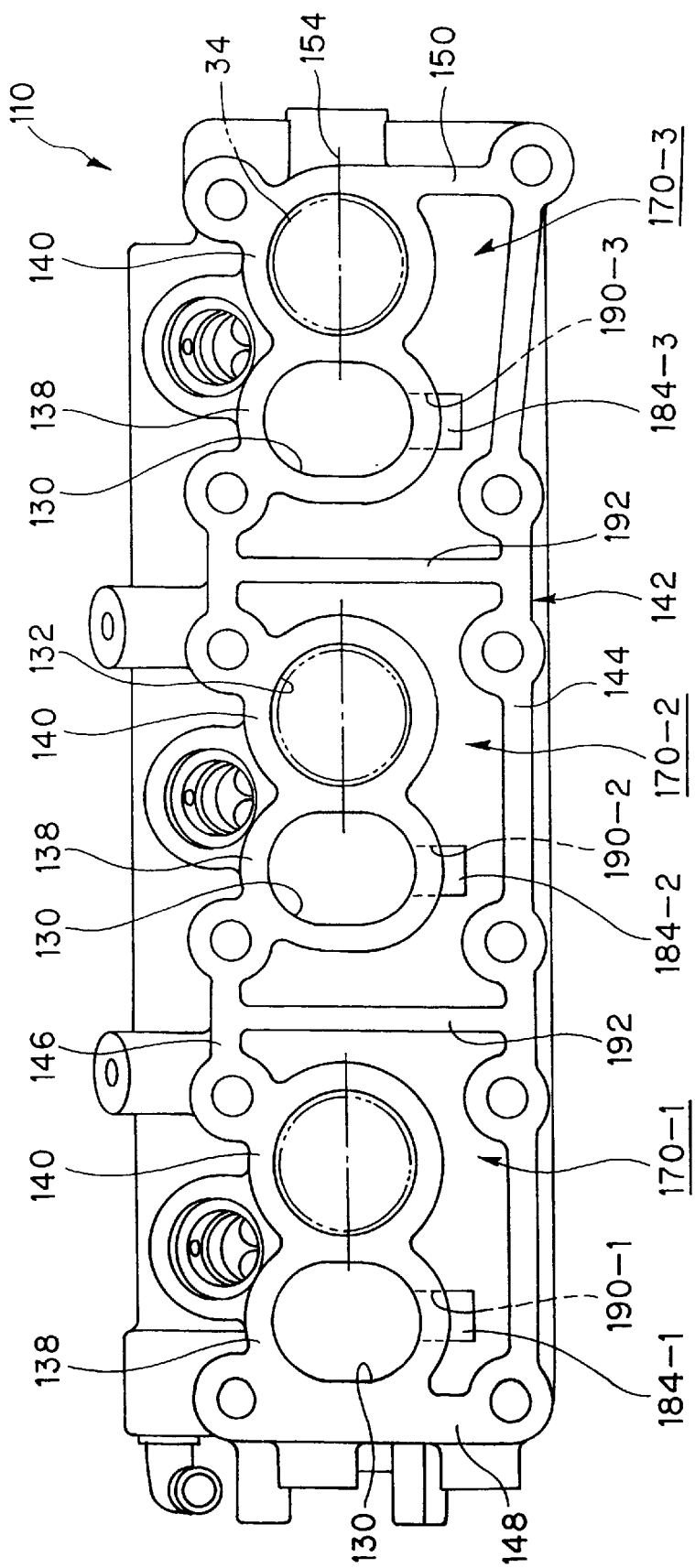
FIG. 15 is a plan view illustrating a swirl valve assembly according to a fourth embodiment.

FIG. 15 illustrates a suction system 16 according to a fourth embodiment. In the suction system 16 according to this embodiment, walls 192 extend between the transverse opposite peripheral walls 144, 146 (which walls 144, 146 are opposed to one another). Each wall 192 is located between two adjacent pairs of first and second intake passage walls 138, 140. Thus, the transverse opposite peripheral walls 144, 146 are interconnected through the walls 192. In addition, the walls 192 divide the tank chamber into first, second, and third tank chambers 170-1, 170-2, and 170-3. Further, first, second, and third mounting holes 190-1, 190-2, and 190-3 are provided in the respective first intake passage walls 138 that are surrounded by the first, second, and third tank chambers 170-1, 170-2, and 170-3. Moreover, first, second, and third check valves 184-1, 184-2, and 184-3 are disposed in the first, second, and third mounting holes 190-1, 190-2, and 190-3, respectively. The check valves 184-1, 184-2, and 184-3 are opened so as to introduce higher, medium, and lower degrees of negative suction pressure from the respective first intake passages 130 into the respective tank chambers 170-1, 170-2, and 170-3.

The suction system 16 according to the fourth embodiment is formed with the first through third tank chambers 170-1, 170-2, and 170-3. The suction system 16 further has the first through third check valves 184-1, 184-2, and 184-3 disposed in the tank chambers 170-1, 170-2, and 170-3, respectively, for introducing the negative suction pressure having different degrees of intensity into the tank chambers 170-1, 170-2, and 170-3. Thus, the negative suction pressure having different degrees of intensity can be reserved separately in the tank chambers 170-1, 170-2, and 170-3. As a result, for each negative pressure-operated apparatus that requires a different intensity of negative suction pressure as a working pressure, the negative suction pressure having the appropriate or necessary intensity can be supplied, thereby providing reliable operation of such an apparatus. In addition, similarly to the previously described embodiments, in the suction system 16 according to the fourth embodiment it is possible to eliminate a communication pipe 176 which otherwise would be provided outside the main body 110. As a result, the suction system 16 according to the present embodiment has fewer components, is lighter weight, is compact in size, and better utilizes space in an engine room.

In the above-described embodiments, the swirl valve assembly 30 has the tank chamber 170 formed in the main body 110 toward the manifold contact surface 112. However, the present invention is not limited to this particular structure.

Figure 16:
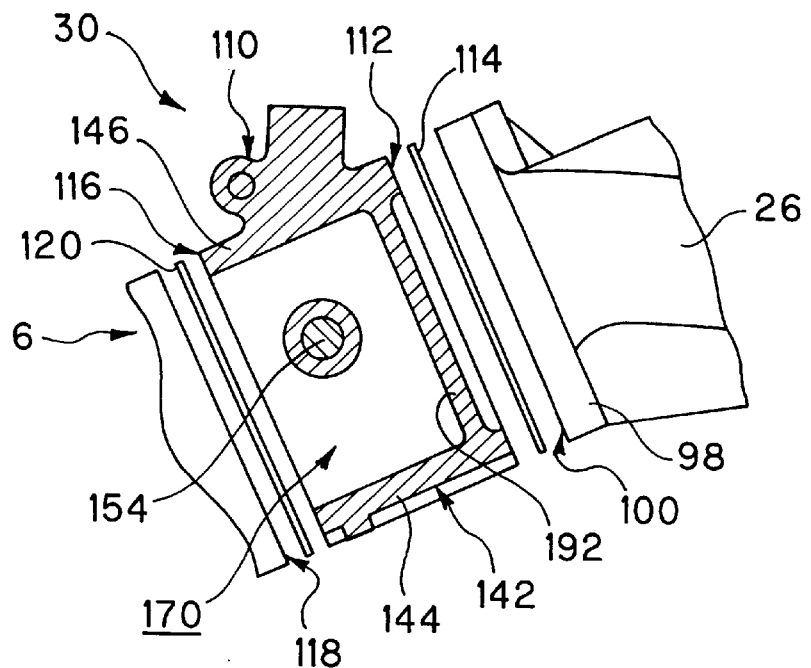
FIG. 16 is a cross-sectional view showing a swirl valve assembly according to a fifth embodiment.

For example, a suction system 16 according to a fifth embodiment is shown in FIG. 16. This embodiment includes a swirl valve assembly 30 that has a tank chamber 170 formed in a main body 110 between first and second intake passage walls 138, 140, a peripheral wall 142, and an upper portion 192. In this embodiment, the tank chamber 170 opens through the head contact surface 116. The peripheral wall 142 is provided in the main body 110, and surrounds the first and second intake passage walls 138, 140. An upper portion 192 is provided inside the peripheral wall 142 near manifold contact surface 112. The upper portion 192 is connected to the transverse opposite peripheral walls 144, 146 and the longitudinal opposite peripheral walls 148, 150. The main body 110 is connected to the assembly contact surface 118 of the intake manifold 6 through the head gasket 120, and the tank chamber 170 is thereby defined and blocked or enclosed. Then, the tank chamber 170 can be formed toward the head contact surface 116.

It will be appreciated that the tank chamber 170 depicted in FIG. 16 may communicate with intake passage 130 as in the prior embodiments, but would do so via similar arrangements formed on the head contact surface 116 of main body 110 instead of the manifold contact surface 112 as in the prior embodiments.

Figure 17:
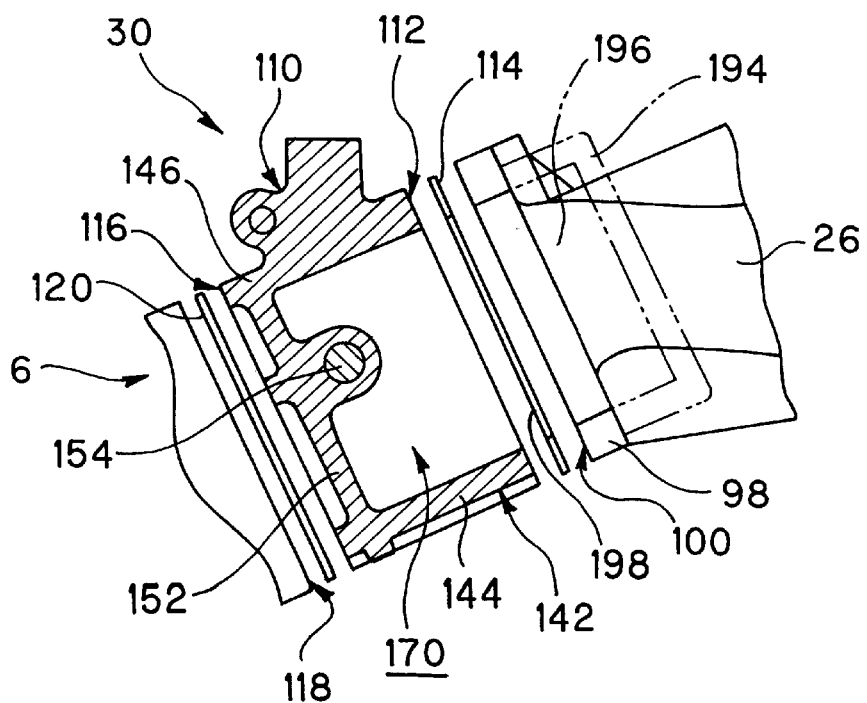
FIG. 17 is a cross-sectional view showing a swirl valve assembly according to a sixth embodiment; and, FIG. 18 is a plan view showing a swirl valve assembly according to the prior art.
Figure 18:
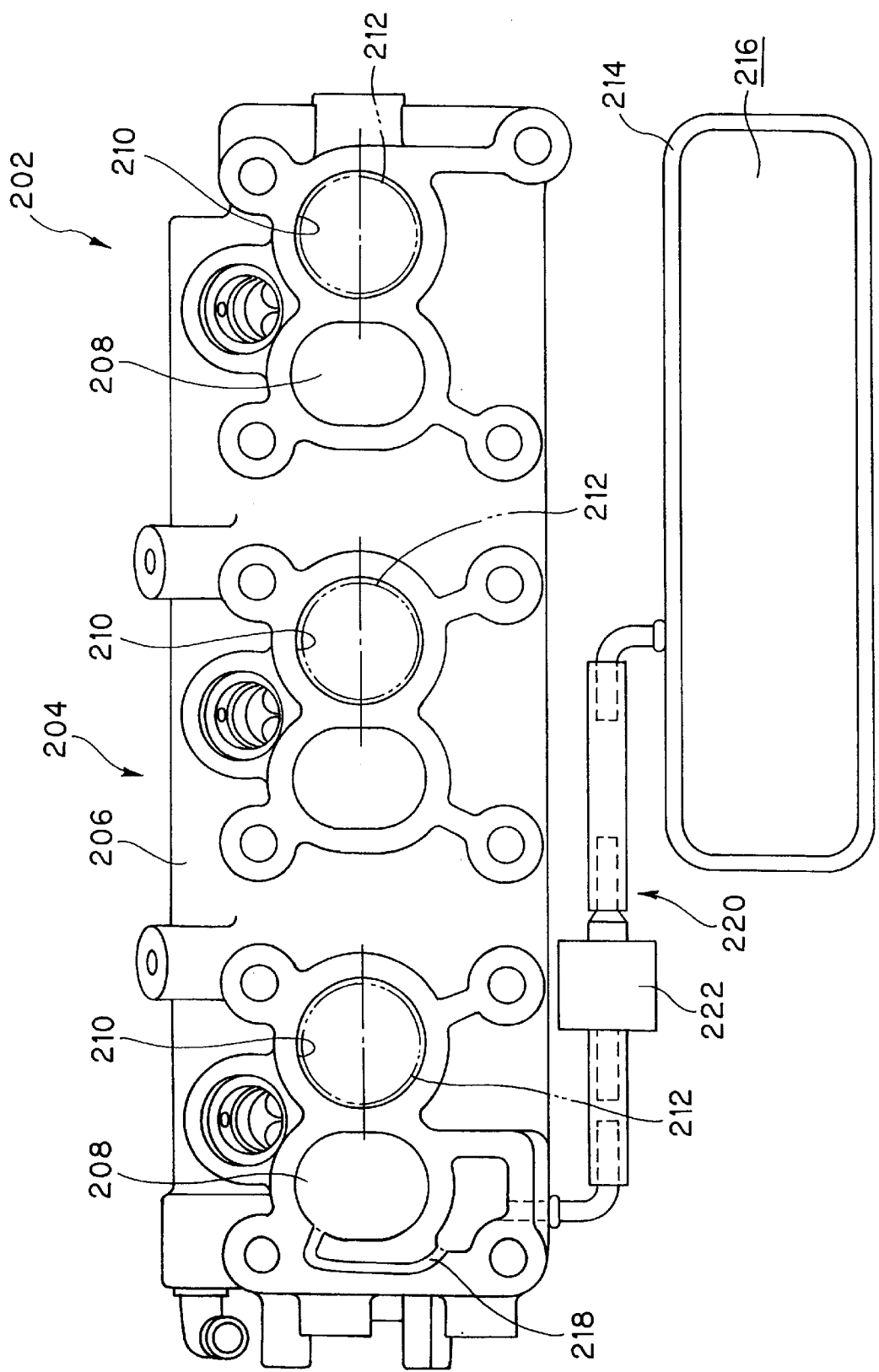

In a suction system 16 according to a sixth embodiment of the invention as shown in FIG. 17, a swirl valve assembly 30 has a tank chamber 170 formed in a main body 110 between first and second intake passage walls 138, 140, a peripheral wall 142, and bottom portion 152. The tank chamber 170 opens through manifold contact surface 112. In addition, the intake manifold 28 has a manifold side tank chamber 196 formed in a mounting flange 98 by means of a tank partition wall 194.

The swirl valve assembly 30 is connected to the mounting flange 98 through manifold gasket 114. Then, the tank chamber 170 in the swirl valve assembly 30 and the manifold side tank chamber 196 are connected together through a communication hole 198 of the manifold gasket 114, and are thereby defined and blocked. As a result, the combined tank chambers 170 and 196 have a greater storage capacity as compared to the above-described embodiments.

As described above, in the suction system according to the present invention, the negative pressure tank is integrally provided in the swirl valve assembly. This structure makes it possible to eliminate a separate negative pressure tank, a mounting bracket, etc. from the suction system, and further to eliminate the need for a space for a separate negative pressure tank and a pipe. In addition, the swirl valve assembly can be made higher in strength by means of the peripheral wall extending around the first and second intake passage walls, which walls form the first and second intake passages. Thus, the intake manifold can rigidly be mounted on the swirl valve assembly. As a result, vibrations from the throttle body mounted on the intake manifold is controllable.

Consequently, the suction system has fewer components, is lighter in weight, and makes more efficient utilization of space in an engine room. Further, the suction system enables improved rigidity of the swirl valve assembly, improved mounting rigidity of the intake manifold, and improved reliability of the throttle body.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A suction system for a multi-cylinder internal combustion engine having branch pipes of an intake manifold disposed on and connected to a cylinder head through a swirl valve assembly, said suction system comprising:

first and second intake passages provided in a main body of the swirl valve assembly and a swirl valve disposed in one of the first and second intake passages, the first and second intake passages communicating with a single combustion chamber;

a tank chamber provided in the main body and formed between first and second intake passage walls and a peripheral wall surrounding the first and second intake passage walls, the first and second intake passage walls forming the first and second intake passages, the tank chamber being defined and blocked by being connected to one of the branch pipes and the cylinder head;

a negative pressure introduction passage provided in the main body for introducing negative suction pressure from the other of the first and second intake passages into the tank chamber, the tank chamber being divided into first and second tank chamber portions, the first tank chamber portion communicating with the negative pressure introduction passage, the second tank chamber portion being isolated from the first tank chamber portion; and a communication pipe for providing communication between the first and second tank chamber portions and a check valve disposed in the communication pipe for permitting the negative suction pressure to be introduced into the second tank chamber portion from the first tank chamber portion.

2. The suction system for a multi-cylinder internal combustion engine according to claim 1, wherein the swirl valve assembly includes a negative pressure take-off pipe provided on the main body, the negative pressure take-off pipe supplying the negative suction pressure from the second tank chamber portion to a negative pressure-operated apparatus, the communication pipe and the negative pressure take-off pipe being disposed so as to assume downward positions when the swirl valve assembly is connected to the cylinder head.

3. A suction system for an internal combustion engine having an intake manifold structure with a plurality of branch pipes each defining a passage therein which is divided into first and second passages at a downstream end of the respective branch pipe, the downstream ends of the branch pipes being associated with a cylinder head, structure of the engine and a plurality of combustion chambers being defined at least in part by the cylinder head structure wherein each branch pipe communicates with a single combustion chamber, said suction system comprising:

a swirl valve assembly disposed between and interconnecting the downstream ends of the branch pipes and the cylinder head structure, said swirl valve assembly having a main body which defines therein a plurality of pairs of first and second adjacent intake passages which respectively communicate with the first and second passages of a respective branch pipe and the corresponding combustion chamber, and a swirl valve disposed in each said first intake passage; and said main body including first and second walls which respectively define said first and second intake passages and project outwardly from a surface of said main body, and a peripheral wall which projects outwardly from said main body surface in surrounding relationship with said first and second intake passages, said first and second walls, said peripheral wall, and said main body surface together defining a tank chamber which is closed off by one of said structures by connection of said swirl valve assembly thereto, and said main body defining therein a negative pressure passage for supplying negative suction pressure from one of said second intake passages to said tank chamber.

4. The suction system of claim 3 wherein said peripheral wall is formed integrally with and has portions spaced from said first and second walls, and said tank chamber is defined by outwardly facing surfaces of said first and second walls and inwardly facing surfaces of said peripheral wall portions.

5. The suction system of claim 3 wherein said main body has an elongate shape and said peripheral wall has a pair of first wall sections which are spaced from one another and extend along respective opposite longitudinal side edges of said main body surface, and a pair of second wall sections which are spaced from one another and oriented transversely with respect to said first wall sections, said second wall sections extending along respective opposite transverse side edges of said main body surface.

6. The suction system of claim 3 wherein said negative pressure passage is defined in said second wall of said one second intake passage and a check valve is associated with said negative pressure passage and permits the introduction of negative suction pressure from said one second intake passage into said tank chamber.

7. The suction system of claim 6 wherein said check valve is mounted within said negative pressure passage defined within said second wall of said one second intake passage.

8. The suction system of claim 6 wherein a said negative pressure passage is defined in said second wall of a plurality of said second intake passages for supplying negative suction pressure from the respective said second intake passages to said tank chamber, and a said check valve is mounted within each said negative pressure passage.

9. The suction system of claim 3 wherein said pairs of first and second intake passages are separated from one another by a partition wall which projects outwardly from said main body surface, said partition walls dividing said tank chamber into a plurality of chamber portions each associated with a respective pair of said first and second intake passages, said second walls of the respective second intake passages each defining a said negative pressure passage therein, said swirl valve assembly further including a check valve associated with each said negative pressure passage which permits the introduction of negative suction pressure from the respective second intake passage into the corresponding chamber portion.

10. The suction system of claim 9 wherein said check valves associated with the respective said negative pressure passages are operable to introduce differing degrees of negative suction pressures into the corresponding said chamber portions for the operation of different negative pressure-operated apparatus.

11. The suction assembly of claim 3 wherein said tank chamber is closed off and sealed by a surface defined on a mounting flange provided on the downstream ends of the branch pipes.

12. The suction assembly of claim 3 wherein said tank chamber is closed off and sealed by a mounting surface of the cylinder head structure.

13. A suction system for an internal combustion engine having an intake manifold structure with a plurality of branch pipes each defining a passage therein which is divided into first and second passages at a downstream end of the respective branch pipe, the downstream ends of the branch pipes being associated with a cylinder head structure of the engine and a plurality of combustion chambers being defined at least in part by the cylinder head structure wherein each branch pipe communicates with a single combustion chamber, said suction system comprising:

a swirl valve assembly disposed between and interconnecting the downstream ends of the branch pipes and the cylinder head structure, said swirl valve assembly having a main body which defines therein a plurality of pairs of first and second adjacent intake passages which respectively communicate with the first and second passages of a respective branch pipe and the corresponding combustion chamber, and a swirl valve disposed in each said first intake passage; and said main body including first and second walls which respectively define said first and second intake passages and project outwardly from a surface of said main body, and a peripheral wall which surrounds said first and second intake passages, said peripheral wall, said main body surface and said first and second walls together defining a tank chamber which is closed off by one of said structures, and said main body defining therein a negative pressure passage for supplying negative suction pressure from one of said second intake passages to said tank chamber, said tank chamber including first and second separate chamber portions and said negative pressure passage communicating with said first chamber portion, and said swirl valve assembly further including a communication pipe mounted on said main body which permits communication between said first and second chamber portions, and a check valve associated with said communication pipe which permits the introduction of negative suction pressure from said first chamber portion into said second chamber portion.

14. The suction system of claim 13 wherein a negative pressure pipe is mounted on said main body, said negative pressure pipe communicating with said second chamber portion for supplying negative suction pressure stored therein to a negative pressure-operated component of the engine.

15. A suction system for an internal combustion engine having an intake manifold structure with a plurality of branch pipes each defining a passage therein which is divided into first and second passages at a downstream end of the respective branch pipe, the downstream ends of the branch pipes being associated with a cylinder head structure of the engine and a plurality of combustion chambers being defined at least in part by the cylinder head structure wherein each branch pipe communicates with a single combustion chamber, said suction system comprising:

a swirl valve assembly disposed between and interconnecting the downstream ends of the branch pipes and the cylinder head structure, said swirl valve assembly having a main body which defines therein a plurality of pairs of first and second adjacent intake passages which respectively communicate with the first and second passages of a respective branch pipe and the corresponding combustion chamber, and a swirl valve disposed in each said first intake passage; and said main body including first and second walls which respectively define said first and second intake passages and project outwardly from a surface of said main body, and a peripheral wall which surrounds said first and second walls, said peripheral wall, said main body surface and said first and second walls together defining a tank chamber which is closed off by one of said structures, and said main body defining therein a negative pressure passage for supplying negative suction pressure from one of said second intake passages to said tank chamber, said tank chamber including first and second chamber portions and said negative pressure passage communicating with said first chamber portion, said main body including a partition wall which projects outwardly from said main body surface and is disposed to separate said first chamber portion from said second chamber portion, and a check valve mounted on said partition wall permitting the introduction of negative suction pressure from said first chamber portion into said second chamber portion.

* * * * *